United States Patent

[11] 3,611,846

[72] Inventor Jules Louis Jeanneret
 13 a 21, rue Henri Gelin, 79 Niort, (Deux-Sevres), France
[21] Appl. No. 860,328
[22] Filed Sept. 23, 1969
[45] Patented Oct. 12, 1971
[32] Priority Sept. 27, 1968
[33] France
[31] 168,070

[54] TOOL-CARRYING TURRET FOR AUTOMATIC CYCLE LATHE
 7 Claims, 7 Drawing Figs.
[52] U.S. Cl. .................................................. 82/21 A, 29/42, 74/822
[51] Int. Cl. ................................................... B23b 21/00
[50] Field of Search ......................................... 82/21 A, 34 D; 29/42, 43, 485; 74/822, 813 L

[56] References Cited
UNITED STATES PATENTS
| | | | |
|---|---|---|---|
| 857,893 | 6/1907 | Newton ....................... | 29/43 |
| 2,047,181 | 7/1936 | Ferris .......................... | 29/42 |
| 3,224,070 | 12/1965 | Cunningham ................ | 29/42 |

FOREIGN PATENTS
| | | | |
|---|---|---|---|
| 1,221,878 | 7/1966 | Germany ..................... | 82/34 D |

Primary Examiner—Leonidas Vlachos
Attorney—Bacon & Thomas

ABSTRACT: A tool-carrying turret for an automatic lathe is hydraulically actuated by the program of the lathe to index between successive working positions a tool-carrying plate. A locking bar serves in cooperation with one of a plurality of recesses in the plate to lock the plate at each working position. The indexing movement is both rotary and longitudinal relatively the axis of the tool-carrying plate, the longitudinal movement serving to withdraw each tool from the region of the workpiece at the completion of a machining operation and to bring the next tool to the working position relative to the workpiece.

Inventor
JULES LOUIS JEANNERET
By Bacon & Thomas
Attorneys

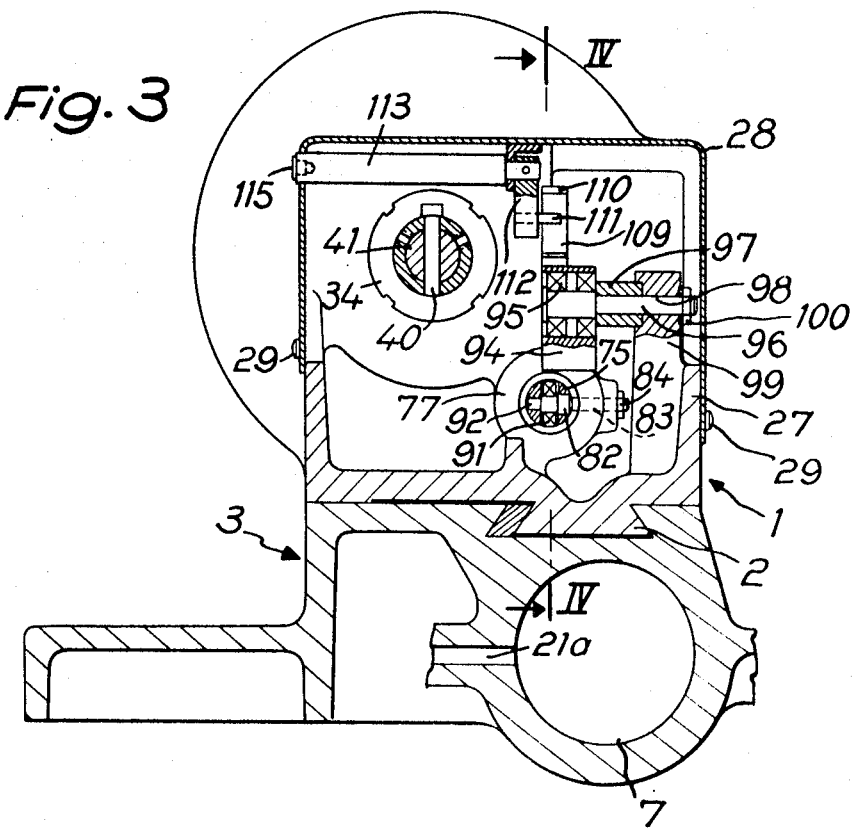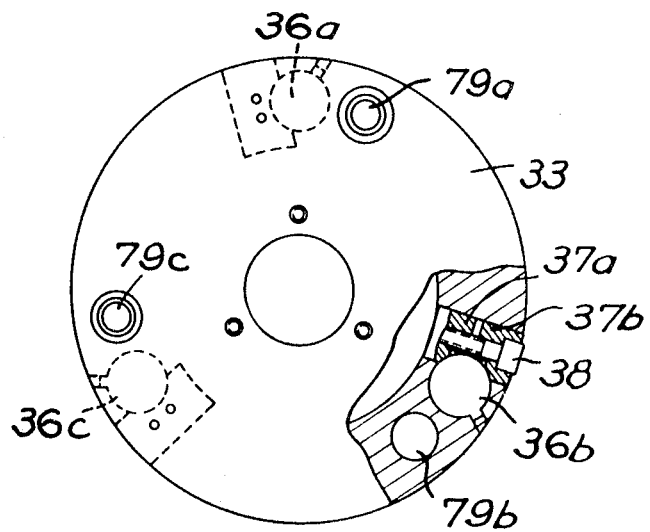

Inventor
JULES LOUIS JEANNERET

Inventor
JULES LOUIS JEANNERET
By Bacon & Thomas
Attorneys

TOOL-CARRYING TURRET FOR AUTOMATIC CYCLE LATHE

This invention relates to a tool-carrying turret particularly for operating with an automatic cycle lathe.

Turrets have been proposed for mounting on lathes which are capable of receiving a plurality of tools, positioned and utilized successively for different machining operations which it is desired to perform on a workpiece.

Automatic cycle lathes have also been proposed of which the various operations of machining are controlled by means of a program.

The object of the present invention is to provide a tool-carrying turret of which the displacements corresponding to one predetermined machining operation, for the use of one fixed tool on the turret, are controlled by a hydraulic cylinder actuated by a hydraulic circuit controlled by the program of the lathe.

Further, the turret is to be used in combination with pivot means and for automatic indexing of which the operation is related to the displacements of the turret.

In this way, the arrangement in accordance with the invention enables completely automatic operation of the tool-carrying turret which is related to the program of the lathe on which it is mounted.

Moreover, the means utilized in combination with the turret are simple and are reliable in operation.

According to the present invention there is provided a tool-carrying turret arranged to be slidable on a base rigid with the longitudinal carriage of an automatic cycle lathe comprising a rotary tool-carrying plate, a hydraulic cylinder in which a piston is slidable having a piston rod rigid during translatory movement of the turret, the said hydraulic cylinder being actuable by a hydraulic circuit controlled by the program of the lathe, the said tool-carrying plate, of which the axis of rotation is parallel with the axis of the piston rod, being connected by pivot means and indexing means controlled by the relative displacements of the turret with respect to the base.

An embodiment of a tool-carrying turret in accordance with the invention will now be described, by way of example, with reference to the accompanying diagrammatic drawings, in which:

FIG. 3 is a cross section of the turret on the line III—III of FIG. 1;

FIG. 7 is a rear view of a tool-carrying plate.

Figure 1:
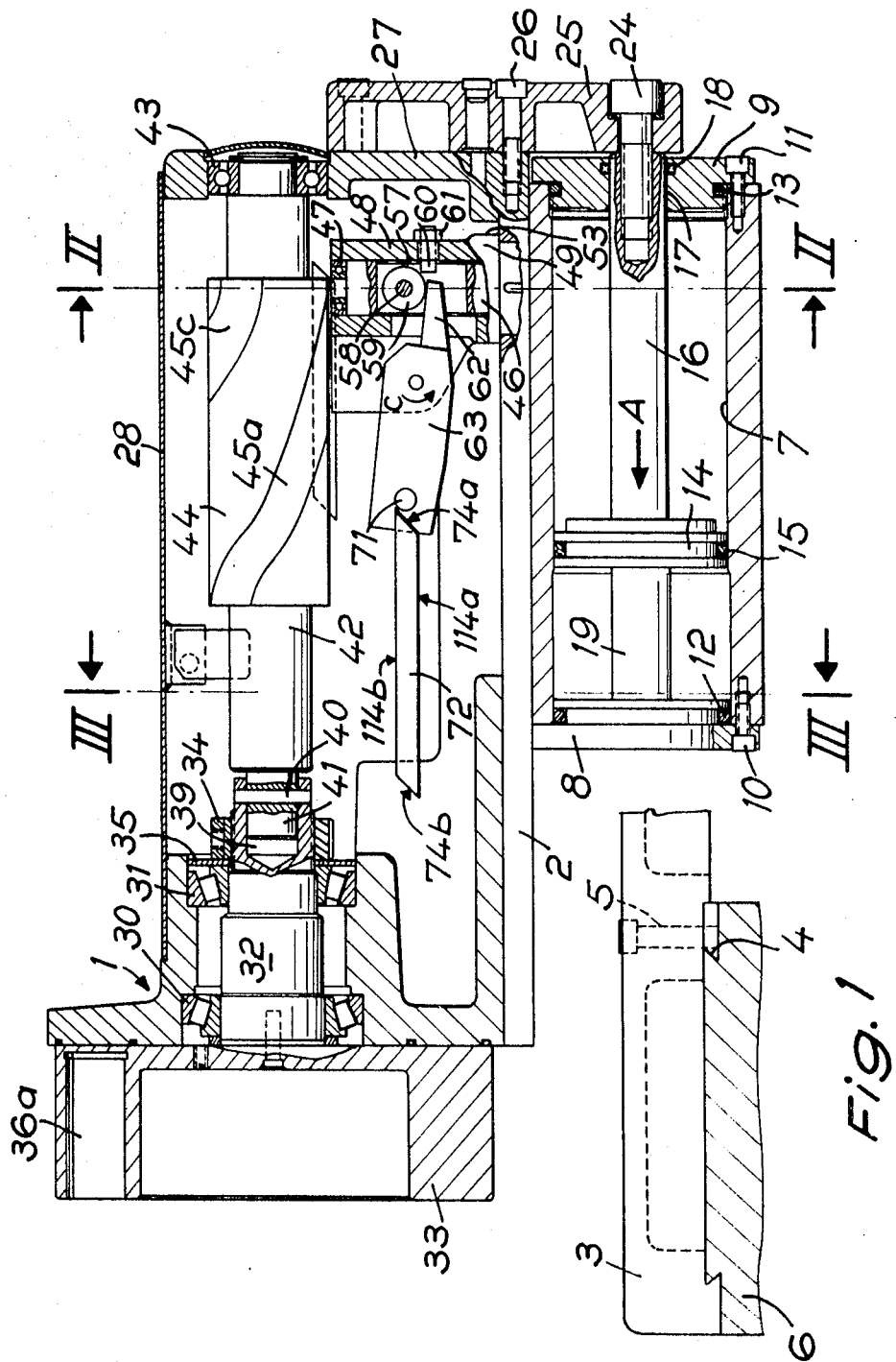
FIG. 1 is a longitudinal section on the line I—I of FIG. 2 of a tool-carrying turret in accordance with the invention.
Figure 2:
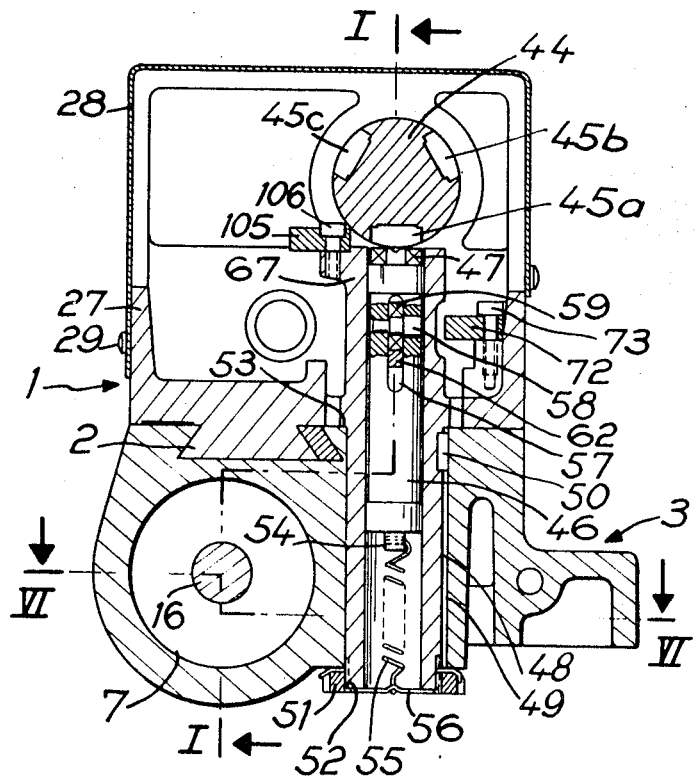
FIG. 2 is a cross section of the turret on the line II—II of FIG. 1.

There is shown in FIGS. 1, 2, 3, 4 and 5, a turret 1 in accordance with the invention which includes a slide 2 of dovetail section, by which it is slidably mounted on a support base 3, itself mounted by a slide 4 and screws 5 on a longitudinal table 6 of an automatic cycle lathe.

In the base 3 there is provided a hydraulic cylinder 7 closed at its two ends by two removable end walls 8 and 9 secured to the wall of the cylinder by bolts such as 10 and 11 and provided respectively with fluidtight seals 12 and 13 disposed between the end faces of the walls 8 and 9 and the wall of the cylinder 7.

In the interior of the cylinder 7 a piston 14 is slidably mounted and is provided with a fluidtight seal 15 and further comprises a rod 16 passing through the end wall 9 via a bore 17, with the interposition of a fluidtight seal 18. The end wall 8 is extended into the cylinder by a rod 19 against which the piston 14 can come into abutment and of which it limits the stroke.

Figure 6:
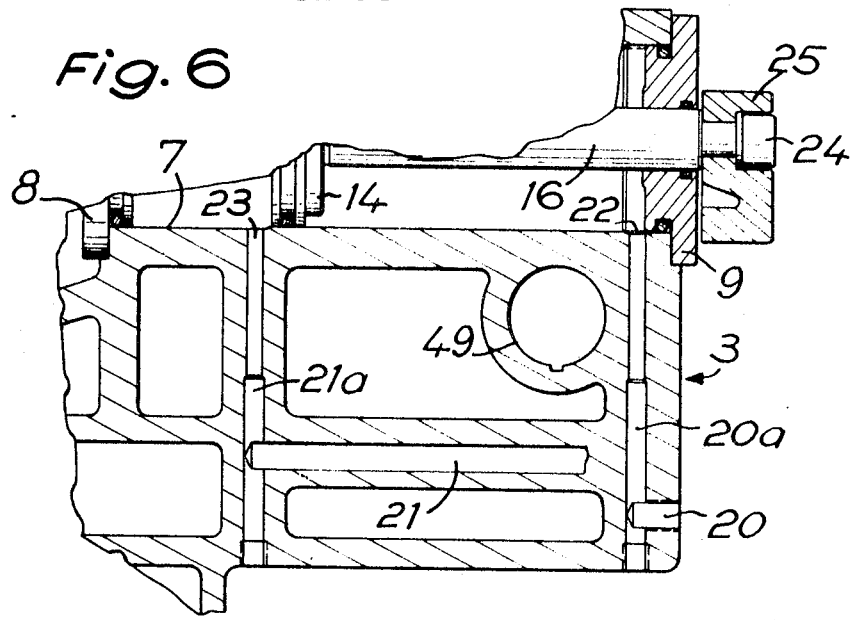
FIG. 6 is a view partially in section of the base and of a hydraulic cylinder on the line VI—VI of FIG. 2.

The cylinder 7 is connected to the hydraulic circuit of the lathe which is controlled by a program by means of two pipes 20 and 21 (FIGS. 5 and 6) which are extended into the interior of the base 3 by channels 20a and 21a, feeding respectively to one face and the other of the piston 14 through orifices 22 and 23.

At the free end of the piston rod 16 a screw 24 secures a stirrup 25 of which the other end is secured by screws 26 on the body 27 of the turret 1.

The body 27 which has an internal chamber closed by a casing 28, secured by means of a screw 29, carries at one of its ends two taper roller bearings 30 and 31 in which is rotatably mounted a half shaft 32 which in turn carries at one of its ends a tool-carrying plate 33 and which is held at its other end by a ring 34 and a washer 35 against the bearing 31.

The tool-carrying plate 33 (FIG. 7) which is rotatably mounted on an axis parallel to the axis of the piston rod 16, by its half shaft 32 in the body 27 of the turret 1, has three sockets 36a, 36b, 36c, spaced adjacent the periphery of the plate and intended to receive tools (not shown in the drawing), which are locked therein by chucks or keys such as 37a and 37b cooperating with a screw 38.

At the opposite end to the tool-carrying plate 33, the half shaft 32 has a blind hole 39 in which is engaged and secured by means of a pin 40, the end 41 of a shaft 42 disposed coaxially with the half shaft 32 and rotatably mounted at its other end in a ball bearing 43 mounted in the body 27 of the turret (FIG. 1).

This shaft 42 has a part of larger diameter constituting a drum comprising on its external wall and spaced equally around its periphery, three helical grooves 45a, 45b and 45c (FIGS. 1 and 2), in which can be selectively engaged one of the ends of a piston 46 which carries a ball bearing 47, the said piston 46 being slidably mounted perpendicularly to the axis of the drum 44 in a guide member 48 in the form of a bush disposed in a bore 49 of the base 3 and maintained in position and secured by means of a key 50 and a nut 51 screwed on a screw-threaded end portion 52 of the said member which is in abutment by a shoulder 53 on the base 3.

At its end opposite to the bearing 47, the piston 46 has an eye 54 in which is engaged one of the ends of a spring 55, of which the other end is secured to a retaining member 56, held against the guide member 48.

Furthermore, the piston 46 has a slot 57 in which is rotatably mounted about a pin 58 a roller 59 and in which is engaged an abutment finger 60 screwed into the guide member 48 and locked by a nut 61, the said finger being adapted just to come into contact with the roller 59 in order to limit the stroke of the piston 46 which is returned by the action of the spring 55.

One of the ends 62 of a lever 63 is arranged to abut against the roller 59, the lever 63 being pivotally mounted at an intermediate part by means of ball bearings 64 about a pin 65 secured in a bore 66 of an extension 67 of the guide member 48, by means of a nut 68 screwed on the screw-threaded end portion of the pin 65 and through the intermediary of a cross bar 69. At the other end of the lever 63 there is secured a spindle 70 which carries a rotatable roller 71 adapted to cooperate with a cam 72 secured by means of screws 73 on the body 27 of the turret 1.

The said cam 72 has its two ends formed as inclined planes 74a and 74b for the guidance of the roller 71.

Parallel to the rotational axis of the tool-carrying plate 33, there is slidably mounted a bar 75 guide by bushes 76a and 76b, secured in a boss 77 formed in the body 27 of the turret, the said bar having at one of its ends a frustoconical parts 78 which is capable of selectively engaging in recesses 79a, 79b, 79c, provided respectively with internally frustoconical rings such as 80 and which are provided in the rear face of the tool-carrying plate 33. The recesses 79a, 79b, 79c are equal in number to the sockets for the tools 36a, 36b, 36c and they are disposed angularly adjacent the periphery of the plate.

The bar 75 has a groove 81 in which is engaged a head 82, formed on the extremity of a gudgeon 83 screwed into the boss 77 and held securely therein by a nut 84.

At its other end, the bar 75 abuts a piston 85 slidably mounted in a bore of a shaft 86 secured by means of a screw 87 on the body 27 of the turret 1, the said piston being subjected to the action of a resilient member constituted by a spring 88 abutting respectively against the piston 85 and the base or end 89 of the bore of the shaft 86.

At one of its ends situated adjacent the piston 85, the bar 75 has a slot 90 in which is arranged a roller bearing 91 rotatably mounted on a spindle 92 fixed to the bar 75, the said roller 91 being in contact with a finger 93 of a bell crank lever 94 pivotally mounted by means of ball bearings 95 on spindle 96 secured with the interposition of a distance piece 97 in a bore 98 of a boss 99 of the body 27, by means of a nut 100 screwed to a screw-threaded end portion of the spindle 96.

The lever 94 is subjected to the action of a resilient member constituted by a spring 101 abutting against the boss 77, in order to maintain the finger 93 in permanent contact with the roller 91.

At its other end 102, the lever 94 carries a spindle 103 on which is rotatably mounted a roller 104 which cooperates with a cam 105, fixed by means of screw 106 on an extension 67 of the guide member 48 which is rigid with the base 3. The cam 105 has two inclined surfaces 105a, 105b and two parallel faces 107a, 107b.

To upper part of the lever 94 is fixed by means of screws 108, a right-angled foot 109 having at its free end a toe 110 arranged to contact a head 111 rigid with a lever 112 secured to a pin 113 pivotally mounted in the casing.

The operation of the tool-carrying turret in accordance with the invention is performed in the following manner.

At the time of one machining pass with one tool disposed in the socket 36b of the tool-carrying plate 33, the latter is locked by the end 78 of the bar 75 which is engaged in the recess 79b. The hydraulic circuit of the lathe which is controlled by a program, delivers a predetermined fluid quantity through the pipe 20 and the channel 20a into the apace of the cylinder 7 lying between the piston 14 and the end wall 9 of the cylinder, the said piston 14 being then positioned adjacent the end wall 9 and the turret assembly being at the end of its return stroke at which the piston rod 16 has left the interior of the cylinder. Under fluid action, the piston 14 drives through its rod 16 and the stirrup 25, the turret 1 which slides by means of its slide member 2 with respect to the base 3, in the direction of the arrow A, thus moving the piston 14 into abutment against the rod 19, as is shown in FIG. 1.

At the end of the turret travel, the table 6 moves on the slide members of the base of the lathe enabling the tool secured at 36b to perform a machining pass.

At the end of this machining pass, the lathe program memory of the lathe causes the rearward movement of the carriage 6, which entrains the base a and the turret assembly 1 as well as the tool-carrying plate 33.

At the end of the return travel of the carriage 6, the lathe program controls the injection of fluid through the pipe 21 and the channel 21a into the space of the cylinder 7 (FIG. 6), disposed between the end wall 8 and the piston 14 which is shown in this position in FIG. 1.

The turret 1 driven by the piston 14 slides with respect to the base 3 in the opposite sense to the arrow A, following a return travel to again take up the initial position.

At the commencement of this return stroke of the turret 1, the cam 72 rigid with the body 27 of the turret 1 comes into contact with its inclined surface 74a with the roller 71 of the lever 63, the latter being fixed since it is rigid through the guide member 48 on which it is mounted, with the base 3. The relative displacement of the cam 72 and of the roller 71 which is guided on the surface 114a on the cam 72, causes pivoting movement of the lever 63 about its pin 65 in the sense of the arrow C, the said lever 63 acting by its end 62 on the roller 59, in order to raise the piston 46 in opposition to the spring 55 and to engage the ball bearing 47 located at its end in the helical groove 45a of the drum 44.

Subsequently the roller 104 of the lever 94 which moves with the body 27 of the turret 1 comes into contact with the inclined face 106a of the cam 105 which is fixed because it is rigid with the guide member 48 of the base 3.

The roller 104 guided on the surface 105a of the cam 105, causes pivoting of the lever 94 about its axis in the sense indicated by the arrow B, in such a manner that the end 93 of the said lever acts upon the roller 91, pushes back the bar 75 in opposition to the action of the spring 88 which is compressed. The return movement of the bar 75 causes the disengagement of its end 78 from the recess 79b thus effecting the unlocking of the plate 33 which is free to rotate on its shaft 32.

The displacement of the turret 1 with which the drum 44 is rigid, with respect to the piston 46 which is secured to the base 3 with which it is rigid, causes through the helical groove 45a, the rotation of the drum 44 and of the tool-carrying plate 33 through one third of a revolution, in order to conduct the tool disposed in the socket 36c into a position for the following machining pass.

Before the end of the stroke of the piston 14, the roller 104 leaves the surface 107a of the cam 105 and the lever arm 102 pivots in the reverse sense to that of the arrow B under the combined action of its spring 101 and of the spring 88 which pushes back through the piston 85, the bar 75 in the direction of the plate 33, so that the end 78 of the said bar is engaged in the following recess 79c of the plate which is thus locked in a new position, in a manner similar to that shown in FIG 4.

The tool mounted in the socket 36c is thus positioned in order to carry out the following machining pass.

At the end of the stroke of the piston 14, the roller 71 leaves the face 114a of the cam 72, the lever 63 pivots in the opposite sense to that of the arrow C under the action of the piston 46 returned by the spring 55, and the piston 46 being disengaged from the groove 45a returns to its initial inoperative position.

In the course of this new machining pass after the displacement of the turret 1 with respect to the base 3 in the direction of the arrow A, the levers 63 and 94 are guided by the cams 72 and 105 in order to be maintained in the inoperative position, in such a manner that no action whatsoever is effected on the piston 46 and the bar 75. At the end of the stroke, the levers 63 and 94 are once again in the position illustrated in FIG. 1 ready to act afresh for a new rotation of the plate 33 through one third of a revolution in order to bring the tool disposed in the socket 36a into a machining position for another pass.

While in the embodiment described and shown, a plate 33 for carrying three tools is used, it is clear that it is also possible to use a different number of tools, which gives rise to a corresponding modification in the number of recesses 79 and grooves 45.

Figure 4:
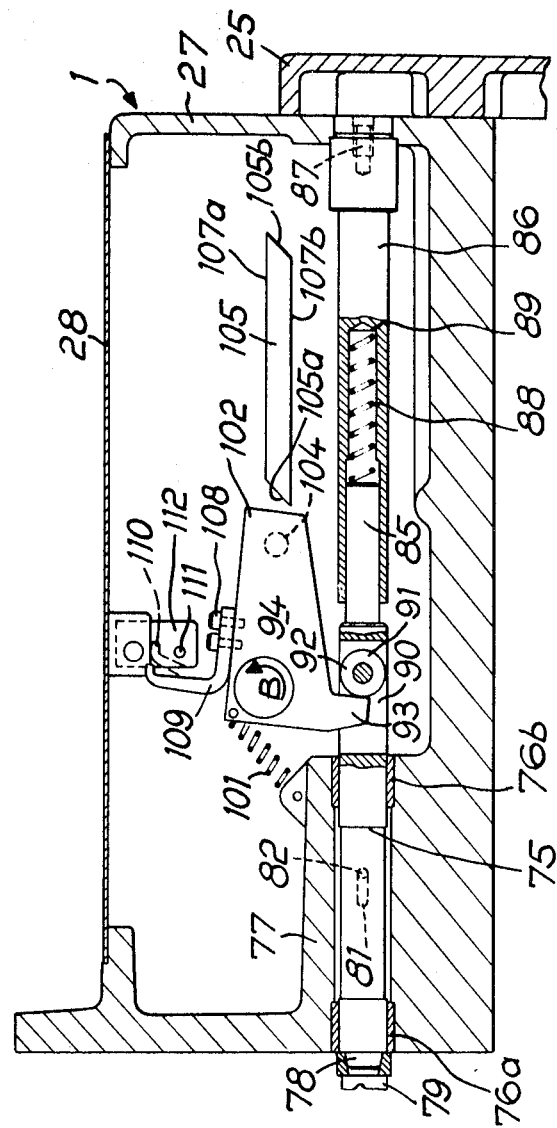
FIG. 4 is a longitudinal section of the turret on the line IV—IV of FIG. 3.
Figure 5:
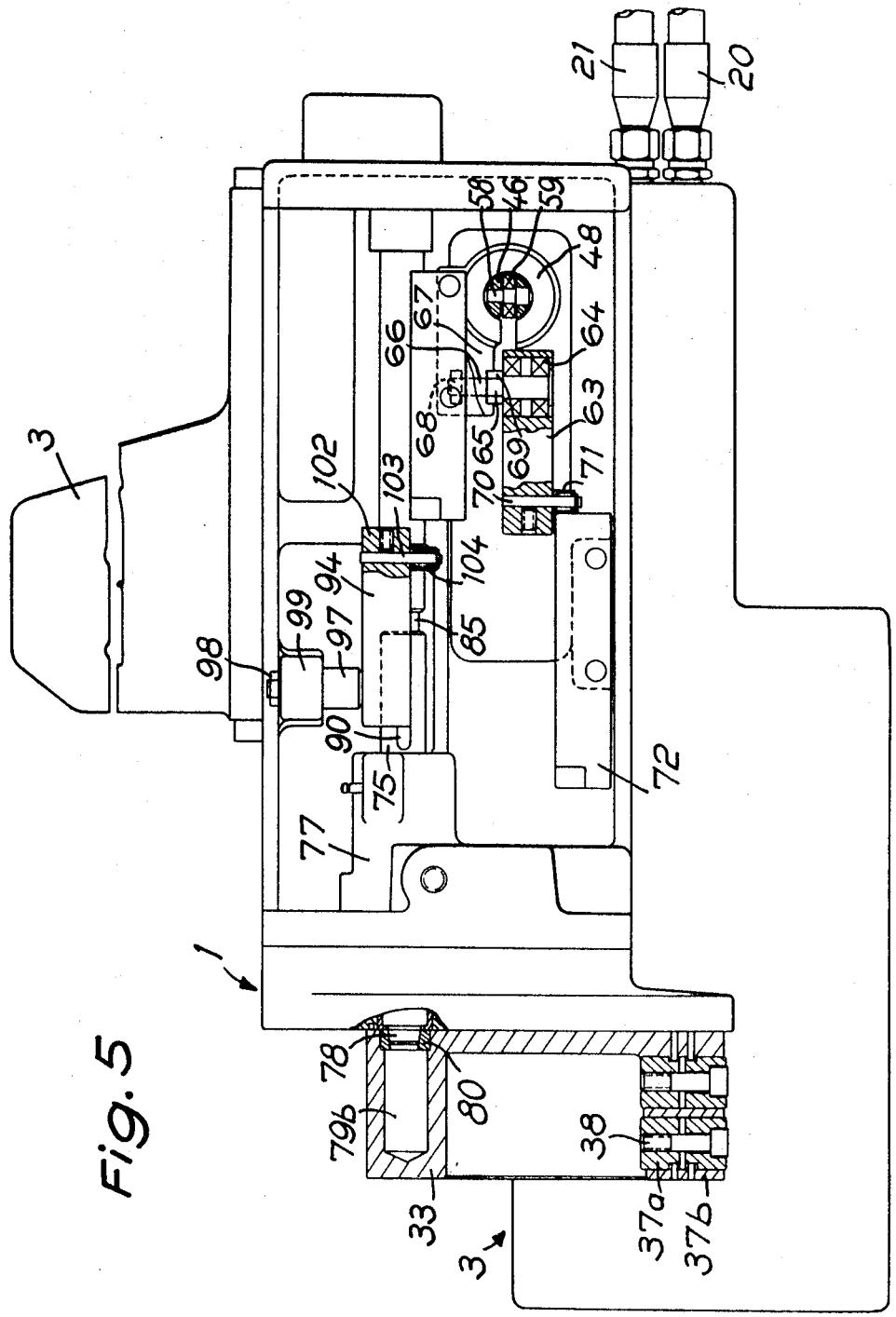
FIG. 5 is a plan view of the turret with certain parts omitted.

In certain cases, it may be necessary to act upon the locking bar 75 independently of the automatic control apparatus in order to modify the position of a tool and for this purpose a lever 112 is provided which can be actuated by the spindle 113, particularly by means of a key engaged in the recess 115, in order to swing the lever 112 as shown in broken lines in FIG. 4 and to engage the head 111 in the toe 110 in order to entrain the foot 109 and the lever 94 which swings about its spindle 96 in the direction of the arrow B. Thus, as it has been hereinbefore shown the swinging of the lever 94 which acts on the roller 91 causes return movement of the bar 75 against the action of the spring 88 and the unlocking of the plate 33. As soon as action by the lever 112 on the spindle 113 ceases, the bar 75 is returned into the locking position by its spring 88.

I claim:

1. In a tool-carrying turret for use with an automatically programmed lathe,
a rotatable tool-carrying plate capable of supporting a plurality of tools,
means for rotating the plate between predetermined angular positions, comprising a drum rotatable about an axis coincident with the axis of rotation of the plate and having a plurality of helical grooves,
a piston arranged to engage by one end thereof successively in the grooves of the drum, a guide member in which the piston is slidable, a roller carried by the piston, a pin mounted in fixed spatial relationship with respect to the guide member, a two-armed lever pivoted on the pin, resilient means biasing the piston to space said one end thereof from the drum, the roller cooperating with one arm of the lever against the action of the resilient means to move the said one end of the piston into engagement with a said drum groove, a cam-follower mounted on the other arm of the lever, and a cam mounted to cooperated with the cam-follower, longitudinal movement of the plate serving to cause actuation of the cam-follower by the cam and thereby engagement of the said one piston end in the said groove of the drum to rotate the plate from one work position to the next, means for moving the plate in a direction parallel to the axis of rotation of the plate, comprising a hydraulic cylinder, and a double-acting piston, connection means for connecting the plate-moving means with the program means of the lathe, comprising two hydraulic pipes, one being connected to the chamber of the cylinder partly defined by one face of the piston and the other being connected to the chamber of the cylinder partly defined by the other face of the piston, operation of the plate-moving means serving to actuate the means for rotating the plate.

2. A turret according to claim 1 wherein the number of helical grooves on the drum corresponds to the number of tool-carrying positions of the plate.

3. A turret according to claim 1, comprising means for locking the plate in each one of the angularly spaced working portions at which a recess is provided in the rear face of the plate, said locking means including a locking bar having one end arranged to engage selectively in one of the rear recesses of the plate, resilient means biassing the bar into the said recess, a roller carried by the bar, a pivotal two-armed lever one arm of which engages the roller carried by the bar, a cam-follower carried by the other arm of the two-armed lever, and a cam cooperating with the cam follower to pivot the lever and thereby retract the said bar end from a said recess in the rear of the plate immediately before any given rotary movement of the plate and to pivot the lever in the reverse direction to allow engagement of the bar with the next recess.

4. A turret according to claim 3, wherein the number of recesses in the rear face of the plate corresponds to the number of tool positions on the plate.

5. A turret according 3 claim 3, further comprising an elongate member having a blind bore therein and carrying therein said resilient means, which abuts at one end against the closed end of the bore, and a piston slidable in said bore and biassed into contact with said bar by the said resilient means.

6. A turret according to claim 3, comprising a spring acting on the two-armed lever to maintain said one arm in abutment against the roller carried by the bar.

7. A turret according to claim 3, comprising a casing of the turret, a member secured to the bar-actuating lever having a toe at its free end, a single-arm lever pivotally mounted on the said casing, and a head engageable by said toe to enable engagement and disengagement of the bar in a said recess independently of the lathe program.